(12) United States Patent  
Vier

(10) Patent No.: US 9,429,994 B1  
(45) Date of Patent: Aug. 30, 2016

(54) PORTABLE ELECTRONIC DEVICE TO A DOCKING STATION WITH IMPROVED DOCKING AND RETENTION FEATURES

(71) Applicant: Bradford Edward Vier, Austin, TX (US)

(72) Inventor: Bradford Edward Vier, Austin, TX (US)

(73) Assignee: Xplore Technologies Corp., Austin, TX (US)

(*) Notice: Subject to any disclaimer, the term of this patent is extended or adjusted under 35 U.S.C. 154(b) by 0 days.

(21) Appl. No.: 14/667,107

(22) Filed: Mar. 24, 2015

Related U.S. Application Data

(60) Provisional application No. 61/969,437, filed on Mar. 24, 2014.

(51) Int. Cl.
*H05K 5/00* (2006.01)
*G06F 1/16* (2006.01)

(52) U.S. Cl.
CPC ........... *G06F 1/1632* (2013.01); *G06F 1/1656* (2013.01)

(58) Field of Classification Search
CPC G06F 1/1632; G06F 1/1679; Y10T 24/1382
See application file for complete search history.

(56) References Cited

U.S. PATENT DOCUMENTS

| 6,549,416 B2* | 4/2003 | Sterner | G06F 1/1632 361/679.43 |
| 2010/0081377 A1* | 4/2010 | Chatterjee | G06F 1/1632 455/41.1 |

* cited by examiner

*Primary Examiner* — Robert J Hoffberg
*Assistant Examiner* — Hung Dang
(74) *Attorney, Agent, or Firm* — Egan, Peterman, Enders & Huston LLP

(57) ABSTRACT

According to one embodiment, a docking station is provided with a support surface configured for supporting a back surface of a portable electronic device, a rotating cradle configured for receiving a base of the portable electronic device, and a floating docking connector that extends out of a recess of the rotating cradle for connecting to a docking connector of the portable electronic device. According to one embodiment, the support surface of the docking station may include one or more magnetic structures, which are positioned to align with one or more magnetic structures on the back surface of the portable electronic device and configured to provide a magnetic force to retain the portable electronic device on the support surface.

16 Claims, 7 Drawing Sheets

PORTABLE ELECTRONIC DEVICE TO A DOCKING STATION WITH IMPROVED DOCKING AND RETENTION FEATURES

PRIORITY CLAIM

The present application claims priority to U.S. Provisional Application No. 61/969,437 filed Mar. 24, 2014.

BACKGROUND OF THE INVENTION

1. Field of the Invention

The present invention relates to portable electronic devices and docking stations for docking such devices. More specifically, the present invention relates to a mechanism that improves docking by using a rotational movement to generate a compressive force for engaging docking connectors on the portable electronic device and docking station, while reducing frictional forces on the connectors. The present invention further relates to a portable electronic device and docking station that uses a magnetic force to retain the portable electronic device against a support surface of the docking station and to increase the compressive force applied to docking connector to achieve a more reliable electrical connection.

2. Description of the Related Art

The following descriptions and examples are not admitted to be prior art by virtue of their inclusion within this section.

Portable personal computers (PCs), including tablet PCs, laptop computers, and personal digital assistants (PDAs), allow computer users to utilize many of the functions of a personal computer while facilitating freedom of movement about the workplace. Particularly, tablet PCs can offer a very high level of mobility and flexibility to the user. Tablet PCs are often used in the medical profession, where a doctor or nurse can use the tablet PC in place of a pen and paper. The tablet PC allows users to easily update files electronically while also recording data on a single device and moving from point to point. Tablet PCs are also common in manufacturing and warehouse environments, where users benefit from being able to remain mobile and use a single device to electronically record data from many locations for the purposes of keeping track of inventory, performing inspections and managing workloads.

Portable computers are generally lightweight and compact, but may compare unfavorably to desktop computers in some respects because they are generally equipped with smaller keyboards and displays. Further, some portable computers may not have a keyboard, mouse, printer ability, local area network (LAN) connection, or an optical drive. To overcome these shortcomings, many portable computer users connect their computer to a docking station when using their computer in an office environment. The docking station can equip the portable computer with most of the characteristics of a desktop computer. For example, a docking station typically has a power source to charge the battery of the portable computer in addition to numerous ports that provide connectivity to local area networks and peripheral devices, such as optical drives, monitors, display screens, speakers, printers, keyboards, and mice. In addition to portable computers, other portable electronic devices such as smart phones, portable music players (e.g., an mp3 player), e-readers, netbooks, etc. may utilize docking stations for providing power, charging batteries or providing connectivity to networks or peripherals.

In some cases, a user may initiate a docking session by establishing a physical (wired) connection between the docking station and the portable electronic device or computer, usually by engaging corresponding connectors of the portable computer and docking station. When the physical connection is made between the portable computer and the docking station, the docking station provides the portable computer with access to the necessary ports and any connected peripheral devices. In many cases, the interface between a docking station and a portable computer is a specialized, self-aligning high-pin count connector assembly. Because of the complexity and repeated mechanical connection and disconnection of this connector, the connector is susceptible to fatigue related failure. Docking connectors may also be damaged by frictional forces that occur during docking when a portable electronic device or computer is slid into a receptacle of a docking station.

Once aligned and docked, the portable computer is typically latched to the docking station to retain the portable computer on a surface of the docking station. This mechanical latch is needed to reliably retain the portable computer when the docking station is made pivotable to provide multiple viewing angles, or if the docking station is used in a vehicular environment. While it does have the ability to retain and align the portable computer onto a surface of the docking station, the mechanical latch often involves a complex mechanism that requires an extra step to disengage before the portable computer can be removed from the docking station.

A need, therefore, remains for an improved mechanism that not only assists in aligning and engaging the docking connectors of the portable computer and docking station, but also reliably retains the portable computer against a surface of the docking station at all viewing angles and in all environments. Such a mechanism would greatly simplify the docking station by omitting the complex mechanical latch mechanism, and reduce the number of steps the user has to perform to dock and undock the portable electronic device.

SUMMARY OF THE INVENTION

The present invention overcomes the limitations of the prior art by providing a portable electronic device (e.g., a tablet PC) and a docking station that includes a mechanism, which improves docking by using a rotational movement to generate a compressive force for engaging the docking connectors of the portable electronic device and docking station, while reducing frictional forces on the connectors. The present invention also provides a portable electronic device and docking station that uses a magnetic force to align and retain the portable electronic device against a support surface of the docking station, and to increase the compressive force applied to the docking connectors to achieve a more reliable electrical connection there between. The following description of various embodiments of the invention is not to be construed in any way as limiting the subject matter of the appended claims.

According to one embodiment, a docking station is provided with a support surface configured for supporting a back surface of a portable electronic device, a rotating cradle configured for receiving a base of the portable electronic device, and a floating docking connector configured for connecting to a docking connector of the portable electronic device. The rotating cradle is preferably connected to a lower portion of the support surface by a pivot point that allows the rotating cradle to be rotated about a rotational axis toward and away from the support surface of the docking station. In one embodiment, the support surface of the docking station may include a niche for receiving the rotating cradle when the rotating cradle is positioned against the support surface.

When the rotating cradle is rotated about the pivot point away from the support surface, the floating docking connector is concealed within a recess of the rotating cradle, and therefore, is protected. When the rotating cradle is rotated about the pivot point towards the support surface, the floating docking connector extends out of the recess for connecting to the docking connector of the portable electronic device. The rotational motion of the rotating cradle is translated into a linear motion at the docking connectors, which produces a normal compressive force needed to engage the docking connectors.

Unlike some conventional designs, the floating docking connector is not fixedly attached to the rotating cradle, and instead, is configured to be "floating" within the recess of the rotating cradle. In one embodiment, a "floating" docking connector may be implemented by mounting the docking connector on a pair of posts extending inward and substantially perpendicularly from an interior surface of the rotating cradle. Specifically, the floating docking connector is mounted onto the pair of posts via a pair of substantially larger holes formed in a rear portion of the floating docking connector. Because the diameter of the posts is smaller than the diameter of the holes, the floating docking connector is allowed some freedom of movement in the x and y directions. This freedom of movement enables the floating docking connector to rotate slightly separate and apart from the rotating cradle, which may help to better align the floating docking connector with the docking connector of the portable electronic device, reduce frictional forces there between and avoid damage to the docking connectors. Other means for "floating" the docking connector within the recess of the rotating cradle may also be used.

Together, the rotating cradle and the floating docking connector of the docking station provide the mechanism, which improves docking between the portable electronic device and the docking station by translating a rotational motion of the cradle into a linear, compressive force, which is used to engage the docking connectors. In addition to assisting in the alignment and engagement of the docking connectors, the mechanism provides further advantages of reducing frictional forces on, and avoiding damage to, the docking connectors.

In one embodiment, the floating docking connector comprises a contact pad formed on a backside thereof. When the rotating cradle is rotated about the pivot point away from and towards the support surface of the docking station, the contact pad of the floating docking connector rolls against a corresponding contact pad located within a niche of the support surface. The rolling action between the contact pads extends at least a portion of the floating docking connector out of the recess when the rotating cradle is rotated toward the support surface, and retracts the floating docking connector within the recess when the rotating cradle is rotated away from the support surface.

In one embodiment, the floating docking connector further comprises a pair of springs, which are coupled between the rear portion of the floating docking connector and the interior surface of the rotating cradle. Each spring may be wound around one of the posts and configured to provide a spring force, which assists in moving the floating docking connector in and out of the recess when the rotating cradle is rotated about the pivot point away from and towards the support surface. In addition to moving the floating docking connector in and out of the recess, the springs enable the floating docking connector to move slightly in the x and y directions (i.e., the springs assist in "floating" the docking connector).

In one embodiment, the floating docking connector may include a number of pins and the docking connector may include a number of receptacles configured for receiving the pins (or vice versa). In such an embodiment, the spring force provided by the springs may assist in forcing the pins into corresponding receptacles. However, the docking station and the portable electronic device are not restricted to any particular type of docking connectors, and could be implemented with different types of connectors in other embodiments of the invention. In one example, the floating docking connector of the docking station and the docking connector of the portable electronic device may each be implemented with pinless docking connectors. In such an embodiment, the spring force provided by the springs may provide the compressive force needed to ensure tight contact between the pinless docking connectors.

According to one embodiment, the support surface of the docking station may include one or more magnetic structures, which are positioned to align with one or more magnetic structures on the back surface of the portable electronic device and configured to provide a magnetic force to retain the portable electronic device on the support surface. The strength of the magnetic force may generally depend on the size and number of magnetic structures used, and the location of the magnetic structures provided. In general, the magnetic structures may be configured and positioned to provide a magnetic force, which is strong enough to reliably retain the portable electronic device on the support surface of the docking station when the docking station is rotated, pivoted or moved, or used in a vehicular environment. In some embodiments, the use of magnetic structures to retain the portable electronic device may simplify the docking station by eliminating the need to include a mechanical latch and reducing the number of steps the user has to perform to dock and undock the portable electronic device.

Although a mechanical latch may be omitted in preferred embodiments, a mechanical latch is not precluded from the design. In some embodiments, a mechanical latch with a locking mechanism (e.g., a key lock, biometric scanner, keypad, etc.) may be included on the docking station for enhancing the security of the docked portable electronic device, and may be desirable in environments where security is a concern. One exemplary embodiment of such a latch is described in co-pending application Ser. No. 14/667,149, which is entitled "Docking Station with Improved Latching Mechanism" and incorporated herein in its entirety. Other mechanical latches may also be included on the docking station, if so desired. However, these mechanical latches are generally not necessary, if only retention is desired. In most cases, the magnetic structures described herein are sufficient to reliably retain the portable electronic device on the support surface of the docking station.

In addition to reliably retaining the portable electronic device, the one or more magnetic structures respectfully positioned on the support surface of the docking station and the back surface of the portable electronic device may increase the compressive force applied to the docking connectors to mechanically engage the docking connectors, and therefore, decrease the electrical impedance there between. Although the magnetic structures may be positioned in substantially any location, it may be desirable to position the magnetic structures substantially away from the rotational axis of the rotating cradle to increase the compressive force applied to the docking connectors. In one embodiment, the magnetic structures may be arranged near the top edge (or top corners) of the support surface of the docking station. In some embodiments, one or more magnetic structures may also be arranged near the bottom edge (or bottom corners) of the support surface to further assist in aligning and retaining the portable electronic device onto the support surface, and/or for increasing the compressive force applied to the docking connectors.

According to another embodiment, a portable electronic device comprising one or more magnetic structures on a back surface of the portable electronic device is provided herein. In general, the one or more magnetic structures may be positioned to align with one or more magnetic structures located on a support surface of a docking station. When the portable electronic device is docked, the magnetic structures may generally function to align and retain the portable electronic device onto the support surface of the docking station. The magnetic structures may also function to increase the compressive force applied to the docking connectors of the portable electronic device and the docking station to mechanically engage the docking connectors and reduce the electrical impedance there between.

In one embodiment, the one or more magnetic structures positioned on the back surface of the portable electronic device may be arranged near the top edge (or top corners) of the back surface. In some embodiments, one or more magnetic structures may also be arranged near the bottom edge (or bottom corners) of the back surface of the portable electronic device to further assist in aligning and retaining the portable electronic device on the support surface, and/or for increasing the compressive force applied to the docking connectors.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
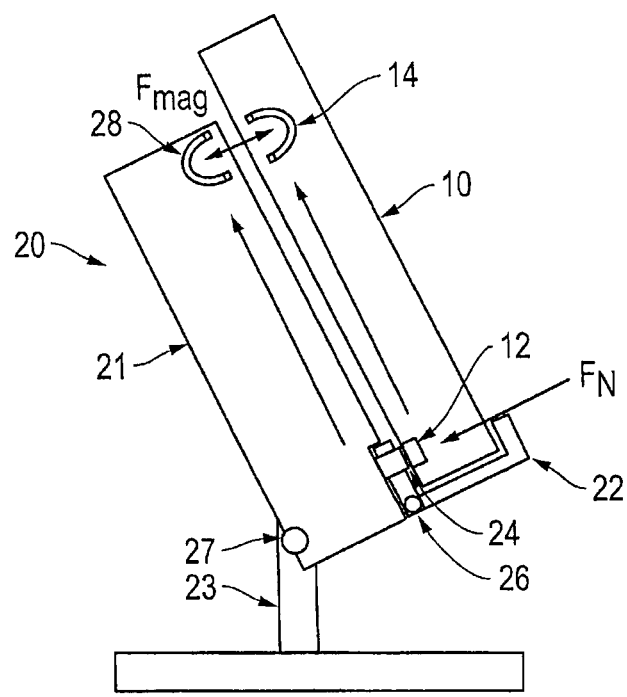
FIG. 1 is a side view of a portable electronic device supported in a rotating cradle of a docking station and retained on a support surface of the docking station by a magnetic force near the top of the portable electronic device, which provides a compressive, normal force near the bottom of the portable electronic device for connecting a docking connector of the portable electronic device to a floating docking connector on the docking station.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIGS. 1-10 illustrate one embodiment of an improved docking station having features that not only assist in aligning and engaging the docking connectors of a portable electronic device and docking station, but also reliably retain the portable electronic device against a support surface of the docking station at all viewing angles and in all environments. The improved docking station represents a significant improvement over conventional docking stations by omitting the complex mechanical latch mechanism typically used on these devices to retain the portable electronic device, thereby reducing the number of steps the user has to perform to dock and undock the portable electronic device. While the present invention is particularly well suited to tablet PCs, and is described as such below, the inventive concepts disclosed herein could be used with other portable electronic devices that can be docked.

FIG. 1 is a side view block diagram of a portable electronic device 10, which is supported in a rotating cradle 22 of a docking station 20 and retained on a support surface 21 of the docking station by a magnetic force ($F_{mag}$) located near the top of the portable electronic device. As described in more detail below, the magnetic force ($F_{mag}$) near the top of the portable electronic device applies a compressive, normal force ($F_N$) near the bottom of the portable electronic device for aligning, engaging and reliably connecting a docking connector 12 of the portable electronic device to a docking connector 24 on the docking station.

Figure 2:
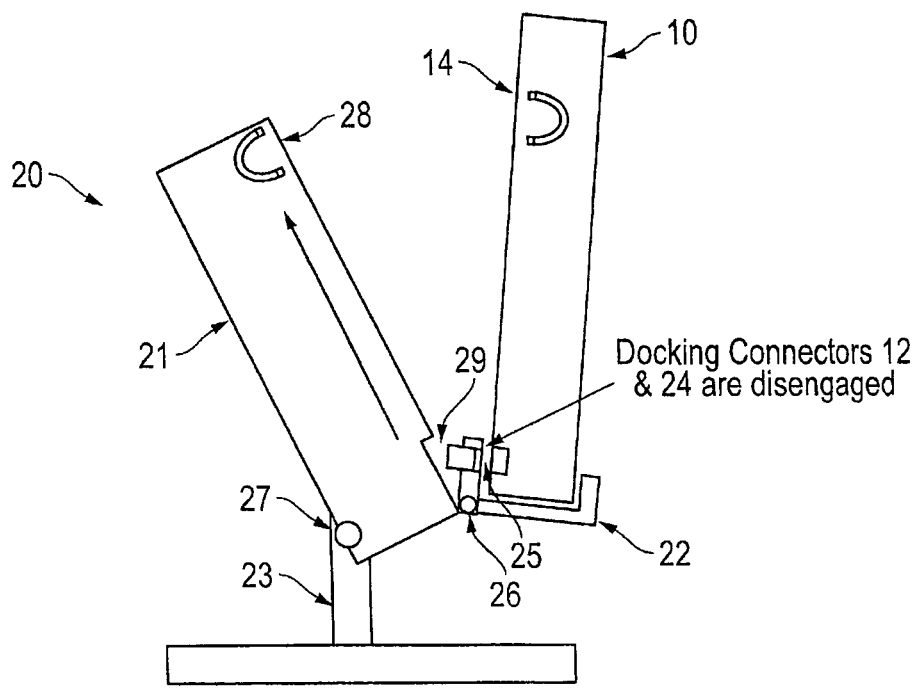
FIG. 2 is a side view of the portable electronic device removed from the surface of the docking station and disengaged from the floating docking connector on the docking station by rotational motion of the rotating cradle.

As shown in FIGS. 1-2 and 4-6, docking station 20 generally comprises a support surface 21 for supporting and retaining the portable electronic device 10 thereon, and a base portion or stand 23 for resting the docking station 20 on a horizontal surface, such as a table. The support surface 21 may be attached to the stand 23 at a fixed angle, or may be made pivotable about at least one axis of rotation to provide the user with a number of different viewing angles. In the embodiment of FIGS. 1-2, the support surface 21 may rotate about pivot point 27 to adjust the viewing angle between about 90° and about 130°. The pivot point 27 may be implemented with an axial hinge connecting the support surface 21 to the stand 23, in one embodiment. However, any other means that allows rotational movement about at least one axis of rotation may be used to implement pivot point 27, in other embodiments.

In addition to the support surface 21 and stand 23, the docking station 20 also comprises a rotating cradle 22 for receiving a base of the portable electronic device 10, and a docking connector 24 for engaging with the docking connector 12 on the back surface of the portable electronic device 10 when the portable electronic device is inserted into the rotating cradle 22 and rotated back to rest on the support surface 21. The rotating cradle 22 is preferably connected to a lower portion of the support surface 21 at a pivot point 26, which allows the rotating cradle 22 to be rotated about a rotational axis toward and away from the support surface 21. Pivot point 26 may be implemented with an axial hinge connecting the rotating cradle 22 to a lower portion of the support surface 21.

In some cases, the support surface 21 of the docking station may include a niche 29 for receiving a portion of the rotating cradle 22 when the cradle is rotated toward and positioned against the support surface. The niche 29 may enable the back surface of the portable electronic device 10 to rest upon, and in substantially parallel alignment with, the support surface 21 of the docking station by accommodating a portion of the rotating cradle 22 within the niche 29. However, the niche 29 may not always be necessary, and may be omitted in some embodiments.

Rotating cradle 22 provides many advantages. For example, pivoting the rotating cradle 22 away from the support surface 21 may make it easier to insert a portable electronic device into the cradle. Once the portable electronic device is inserted within the cradle 22, the act of rotating the cradle facilitates docking of the portable electronic device 10 to the docking station 20 by providing a manual, compressive, normal force ($F_N$) at the respective docking connectors 12/24. Engaging the docking connectors 12/24 through rotational movement of the rotating cradle 22 also provides the advantage of reducing wear and tear on the docking connectors by reducing the frictional forces that would otherwise be generated if a portable electronic device were slid into a fixed, non-rotatable cradle.

In one embodiment, the docking connectors 12 and 24 are implemented with POGO pin connectors, wherein the mating elements of one connector comprises a number of pins and the mating elements of the other connector comprises a number of receptacles for receiving the pins. In one embodiment, docking connector 24 would comprise a number of pins for mating with the same number of receptacles in docking connector 12. Alternatively, docking connector 12 could comprise a number of pins and docking connector 24 could comprise a number of receptacles for receiving the pins. In one embodiment, the docking connectors 12 and 24 may include anywhere from 2 to 40 pins and receptacles. The higher the pin count, the greater the compressive force generally needed to engage the pins and receptacles.

The docking connectors 12 and 24 are not limited to POGO pin connectors and could be implemented with substantially any other connectors that require a compressive force to mechanically engage. In one alternative embodiment, docking connectors 12 and 24 may be implemented with pinless docking connectors, which allow the portable electronic device 10 to be connected to the docking station 20 without the need for a traditional male or female docking connector. Pinless connectors generally comprise a flat surface that is easy to clean and disinfect, as compared to traditional docking connectors that contain either pins or receptacles that make the connector very difficult to wipe clean. As such, pinless docking connectors may be preferred when the portable electronic device 10 and docking station 20 are to be used in adverse environments, such as healthcare, manufacturing, and shipping environments, which may subject the devices to a disproportionately high amount of contaminants, biologicals, dust, dirt or manufacturing byproducts.

As shown in FIGS. 2, 7A, 8A and 9A, docking connector 24 is preferably concealed within a recess 25 of the rotating cradle 22 when the rotating cradle 22 is rotated forward (i.e., away from the support surface 21) about pivot point 26. In some embodiments, concealing the docking connector 24 within the recess 25 may protect the docking connector from frictional forces when the portable electronic device 10 is inserted into the cradle 22.

As shown in FIGS. 1, 7C, 8C and 9B, at least a portion of the docking connector 24 may extend out of the recess 25 in the rotating cradle 22 to connect to the docking connector 12 of the portable electronic device 10 when the device is inserted into the rotating cradle 22 and rotated back (i.e., towards from the support surface 21) about pivot point 26 to rest on the support surface 21 of docking station 20. As noted above, rotating the cradle 22 back towards the support surface 21 facilitates docking of the portable electronic device 10 to the docking station 20 by providing a compressive, normal force ($F_N$) at the respective docking connectors 12/24. As described in more detail below, a mechanism is provided within the rotating cradle 22 for converting the rotational motion of the cradle into a compressive, normal force at the docking connectors 12/24.

In some embodiments, docking connector 24 may include guide features 30 (see, FIGS. 4, 6, 9A, 9B and 10) on the side of the pins to assist in aligning the pins to the receptacles. In some cases, the guide features 30 may be chamfered to help guide the guide features 30 into corresponding guide features 18 included on the portable electronic device (see, FIG. 3). In some embodiments, additional guide features 32 (see, FIGS. 4 and 6) may be included on the rotating cradle 22 as a gross alignment feature to assist in aligning the portable electronic device 10 within the cradle 22. Like the fine alignment guide features 30, the gross alignment guide features 32 may be chamfered to help guide the guide features 32 into corresponding guide features 18 included on the portable electronic device (see, FIG. 3).

In one preferred embodiment, docking connector 24 is not fixedly attached to the rotating cradle 22 of the docking station 20, and instead, is configured to be "floating" within the recess 25. According to one embodiment, a "floating" docking connector 24 may be implemented by inserting the docking connector 24 between grommets (not shown) arranged within the recess 25. The grommets enable the floating docking connector 24 to rotate separate and apart from the rotating cradle 22. According to another embodiment, a "floating" docking connector 24 may be implemented by mounting the docking connector 24 on a pair of posts 40 (see, FIGS. 8A-8C and 9A-9C), whose diameter is slightly smaller than the holes 42 (see, FIG. 10) in the docking connector 24 through which the posts 40 are inserted. The smaller diameter of the posts 40 enables the docking connector 24 some freedom of movement in the x and y directions, and thus, enables the floating docking connector to rotate separate and apart from the rotating cradle 22.

The use of a "floating" docking connector helps to better align the pins of docking connector 24 to the receptacles on docking connector 12, and reduce frictional forces that would otherwise degrade the connection points. In addition, "floating" the docking connector 24 enables the rotational motion of the rotating cradle 22 to be translated into a linear motion, which is used to engage the docking connectors 12 and 24. This further reduces frictional forces between the docking connectors 12 and 24 and avoids damaging the connectors. Other means for "floating" the docking connector 24 may also be used.

Figure 6:
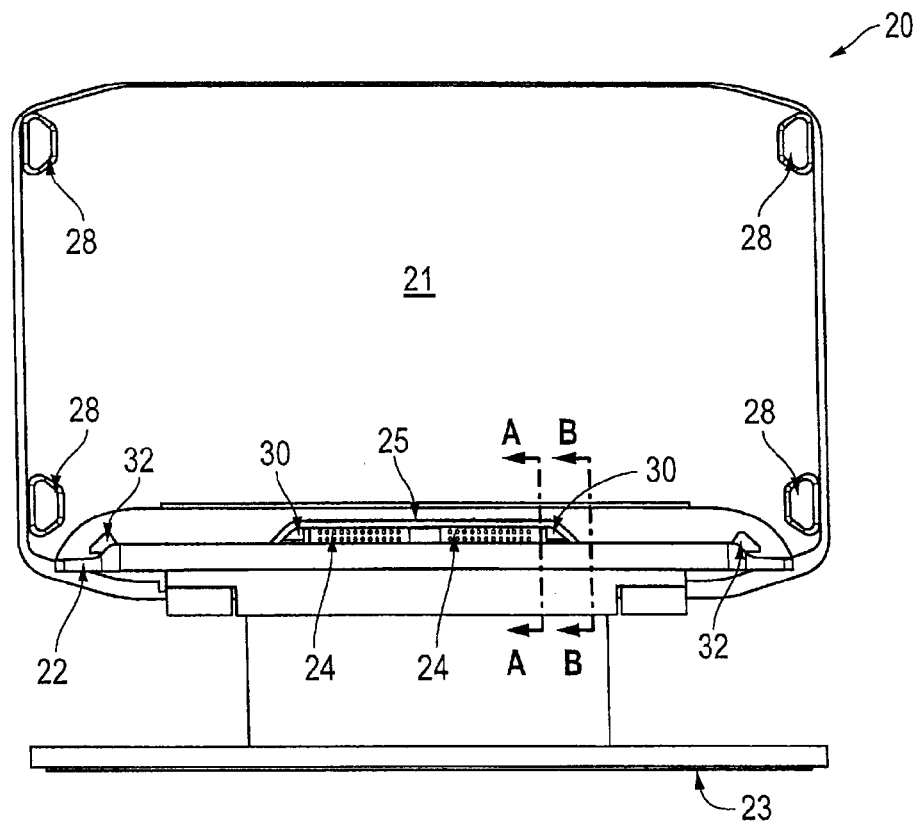
FIG. 6 is a front view of the docking station shown in FIG. 4.
Figure 7C:
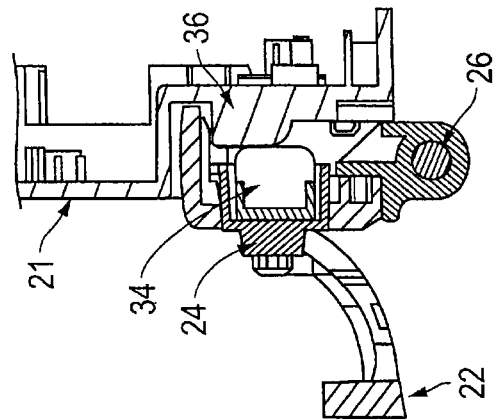
FIGS. 7A-7C are cross-sectional views of the docking station, rotating cradle and floating docking connector through line A of FIG. 6.
Figure 7B:
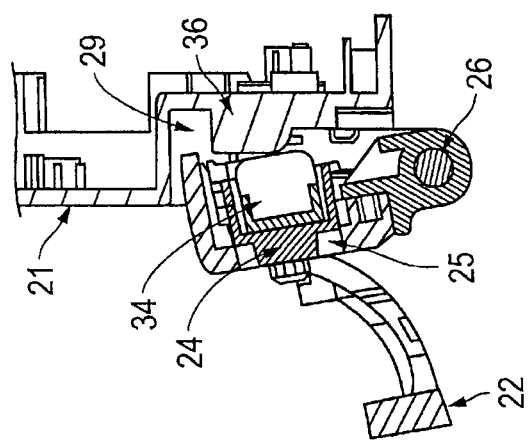
Figure 7A:
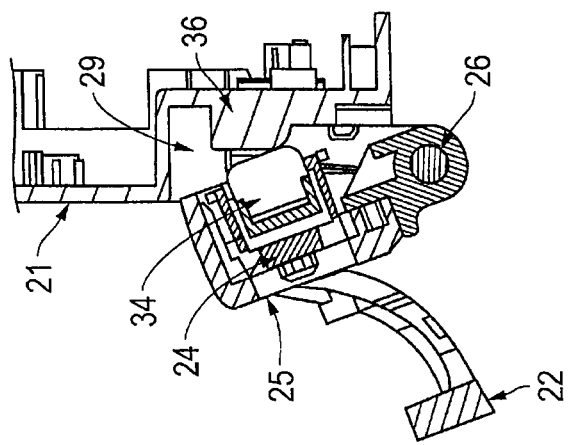

FIGS. 7A-7B are cross-sectional views of the lower portion of docking station 20, the rotating cradle 22 and the floating docking connector 24 through line A of FIG. 6. FIGS. 8A-8B are cross-sectional views of the lower portion of docking station 20, the rotating cradle 22 and the floating docking connector 24 through line B of FIG. 6. Together, these figures illustrate one embodiment of a mechanism, which generally functions to push the floating docking connector 24 out of the recess 25 when the rotating cradle 22 is rotated back towards the support surface 21 of the docking station 20.

FIG. 7A shows the rotating cradle 22 in the fully open position when the rotating cradle is rotated forward about pivot point 26 for receiving a portable electronic device. In the fully open position, the floating docking connector 24 is concealed within the recess 25, such that even the pins are hidden within the recess. As the rotating cradle 22 is rotated about pivot point 26 back towards the docking station support surface 21 to the half-closed position shown in FIG. 7B, and rotated further to the fully closed position shown in FIG. 7C, a contact pad 34 on the backside of the floating docking connector 24 rolls against a contact pad 36 located within the niche 29 of the docking station support surface 21. This rolling action smoothly extends at least a portion of the floating docking connector 24 out of the recess 25, so that the pins of the docking connector 25 may engage with corresponding receptacles in the docking connector 12. Conversely, when the rotating cradle 22 is rotated about the pivot point 26 from the fully closed position shown in FIG. 7C to the fully open position shown in FIG. 7A, the rolling action between the contact pads 34 and 36 smoothly retracts the floating docking connector back into the recess 25. The contact pads 34 and 36 may be formed from a variety of materials (e.g., metal, plastic, rubber, etc.) and may be generally contoured to facilitate the rolling action needed to smoothly extend and retract the docking connector 24. In some embodiments, a spring mechanism (38, 40, 42, FIGS. 8A-8C and 9A-9B) may assist in "floating" the docking connector 24, and in moving the docking connector 24 in and out of the recess 25 when the rotating cradle 22 is rotated around the pivot point 26.

Figure 10:
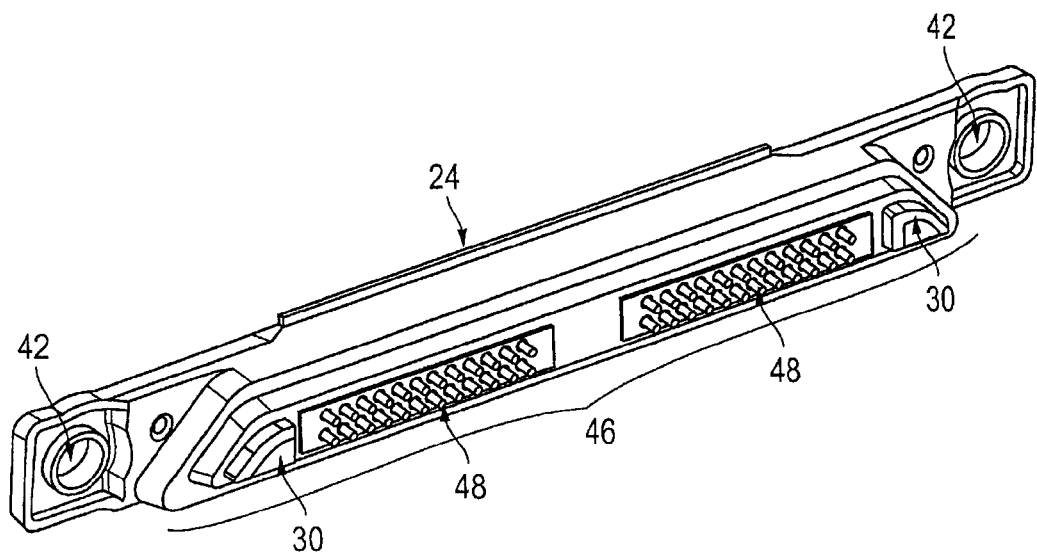
FIG. 10 is a perspective view of the floating docking connector alone.

Like FIG. 7A, FIG. 8A shows the rotating cradle 22 in the fully open position when the rotating cradle is rotated forward about pivot point 26 for receiving a portable electronic device. However, FIG. 8A is a cross-sectional view through line B of FIG. 6, which bisects one half of the spring mechanism mentioned above. As shown in FIG. 8A, the spring mechanism generally includes a pair of springs 38 (only one is shown in the cross section), which are coupled between a rear portion of the floating docking connector 24 and an interior surface of the rotating cradle 22 on either side of the docking connector pins. Each spring 38 is wound around a post 40, which extends inward and substantially perpendicularly from a forward facing interior surface of the rotating cradle 22. Specifically, the pair of posts 40 extends from the interior surface of the rotating cradle, which comprises the recess 25, and extends toward the plane of the support surface 21 when the rotating cradle is in the fully closed position (see, FIG. 8C). When the docking connector 24 is assembled within the rotating cradle 22, the docking connector 24 is mounted onto the posts 40 via holes 42 formed in the rear portion of the docking connector 24, as shown in FIGS. 8A, 9A and 10. A screw 44 is threaded through a distal end of the posts 40 and used as a stop for the floating docking connector 24 when the rotating cradle 22 is in the fully open position.

Figure 8C:
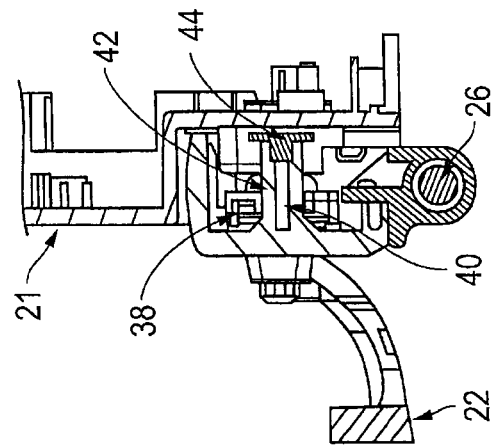
FIGS. 8A-8C are cross-sectional views of the docking station, rotating cradle and floating docking connector through line B of FIG. 6.
Figure 8B:
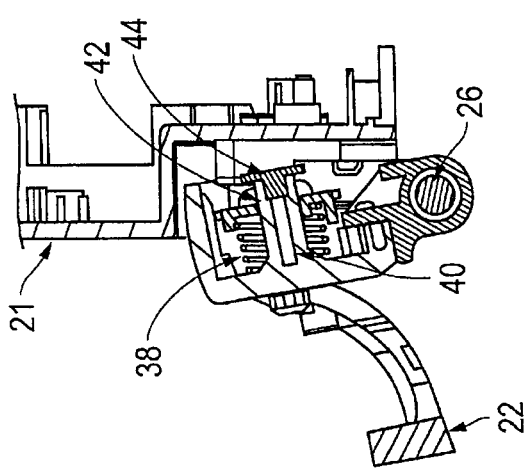
Figure 8A:
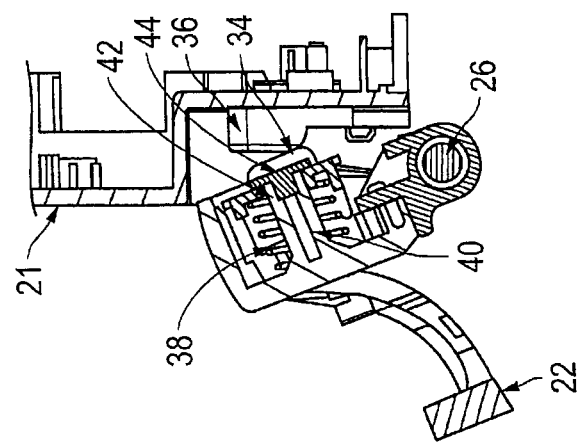

As the rotating cradle 22 is rotated about pivot point 26 back towards the docking station support surface 21 to the half-closed position shown in FIG. 8B, and rotated further to the fully closed position shown in FIG. 8C, the rolling action between the contact pads 34 and 36 push the floating docking connector 24 out of the recess 25, which compresses the springs 38. The spring force provided by the springs 38 assist in extending the floating docking connector 24 out of the recess 25 when the rotating cradle 22 is rotated back towards the support surface 21 of the docking station 20, and in retracting the floating docking connector when the rotating cradle is rotated forward away from the support surface.

In addition to moving the floating docking connector 24 in and out of the recess 25, the spring mechanism preferably provides a means for "floating" the docking connector 24 within the rotating cradle 22. As noted above, and shown in FIGS. 8A-8C, 9A-9C and 10, the floating docking connector 24 is preferably mounted on a pair of posts 40, whose diameter is slightly smaller than the holes 42 through which the posts 40 are inserted. As the rotating cradle 22 is rotated about pivot point 26, the floating docking connector 24 slides along the posts 40, as shown in FIGS. 8A-8C. Because the diameter of the posts 38 is smaller than the diameter of the holes 42 formed in the rear portion of the docking connector 24, the docking connector 24 is allowed some freedom of movement in the x and y directions. This enables the floating docking connector 24 to rotate separate and apart from the rotating cradle 22, which helps to better align the pins of floating docking connector 24 to the receptacles on docking connector 12, and reduce frictional forces that would otherwise degrade the connection points.

Figure 9B:
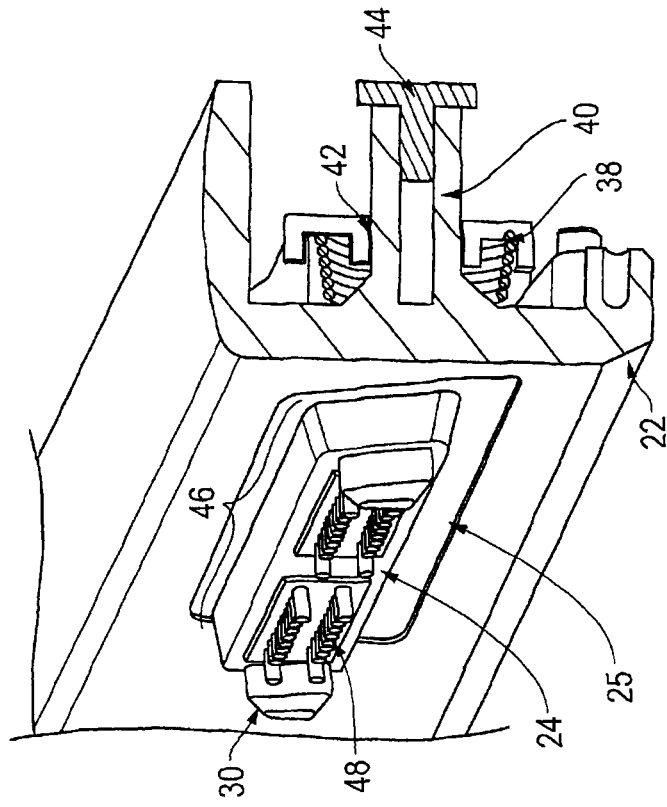
FIG. 9B is a 3D perspective view of FIG. 8C illustrating how the floating docking connector extends out of the recess in the rotating cradle to connect to the docking connector of the portable electronic device when the rotating cradle is rotated back towards the support surface of docking station.
Figure 9A:
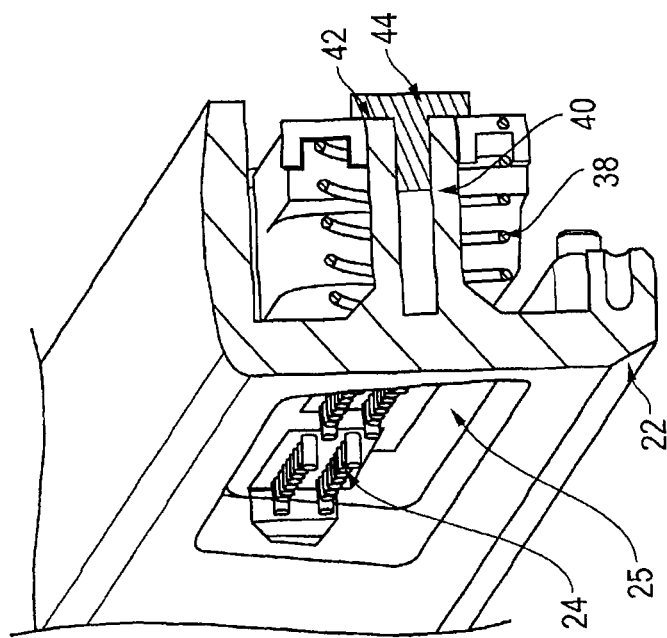
FIG. 9A is a 3D perspective view of FIG. 8A illustrating the floating docking connector as being recessed within the rotating cradle and the spring mechanism extended when rotating cradle is rotated away from the support surface of the docking station to receive the portable electronic device.

FIG. 9A is a 3D perspective view through line B of FIG. 6 illustrating the floating docking connector 24 concealed within the recess 25 when the rotating cradle 22 is rotated forward and the spring mechanism 38, 40, 42 is disengaged. FIG. 9B is a 3D perspective view through line B of FIG. 6 illustrating the floating docking connector 24 extending partially out of the recess 25 when the rotating cradle 22 is rotated back and the spring mechanism 38, 40, 42 is engaged. These figures clearly illustrate how the floating docking connector 24 moves along the posts 40 from an initial position concealed within the recess 25 when the rotating cradle 22 is fully open and the spring mechanism 38, 40, 42 is disengaged (FIG. 9A) to a final docking position. In the final docking position (FIG. 9B), at least a portion of the floating docking connector 24 extends out of the recess 25 for connecting with the docking connector 12 of a portable electronic device 10. In the illustrated embodiment of FIGS. 7C, 8C, 9B and 10, the portion of the floating docking connector 24 extending out of the recess 25 includes a raised portion 46 comprising the pins 48 and fine alignment guide features 30 of the docking connector 24. Other portions of the floating docking connector 24 may extend out of the recess 25 in other embodiments. However, the illustrated embodiment is believed to provide secure mechanical engagement of the pins 48 of the floating docking connector 24 to the receptacles of the docking connector 12.

As noted above, docking connectors 12 and 24 generally require a compressive force to mechanically engage the pins of floating docking connector 24 with the receptacles of docking connector 12, and this compressive force may be relatively high if a large number of pins/receptacles are included within the connectors. In some embodiments, docking station 20 and portable electronic device 10 may each include one or more magnetic structures, at least some of which are located somewhere near the top of the docking station 20 and device 10, to increase the compressive force applied to the docking connectors 12 and 24 and ensure a reliable electrical connection there between.

In one example, docking station 20 may include a first magnet 28 and portable electronic device 10 may include a second magnet 14, as shown in FIGS. 1 and 2. When the portable electronic device 10 is inserted into the rotating cradle 22 and rotated back to rest upon the support surface 21, the magnetic force ($F_{mag}$) between magnets 14 and 28 near the top of the portable electronic device 10 functions to increase the compressive, normal force ($F_N$) applied near the bottom of the portable electronic device 10, which forces the pins of floating docking connector 24 into the receptacles of docking connector 12. The compressive force ($F_N$) applied to the docking connectors 12 and 24 provides a more reliable electrical connection between the docking connectors by decreasing the electrical impedance there between.

Although illustrated in FIGS. 1 and 2 as being located near the top of the docking station 20 and portable electronic device 10, magnets 14 and 28 may be arranged substantially anywhere along the opposing surfaces of these two devices. In general, higher compressive forces are generated near the bottom of the devices by positioning the magnets 14 and 28 closer to the top of the devices and further from the rotational axis provided by pivot point 26. Thus, the compressive force needed to mechanically engage the docking connectors 12 and 24 and provide a reliable electrical connection there between (which may be dependent on the pin count) should be considered when positioning the magnets 14 and 28 on the portable electronic device 10 and docking station 20.

Although the portable electronic device 10 and the docking station 20 are illustrated in FIGS. 1 and 2 as each having only one magnet, the portable electronic device 10 and the docking station 20 may be generally described herein as having one or more magnetic structures. As used herein, a "magnetic structure" is a structure that either generates a magnetic field, or is susceptible to a magnetic field.

Figure 3:
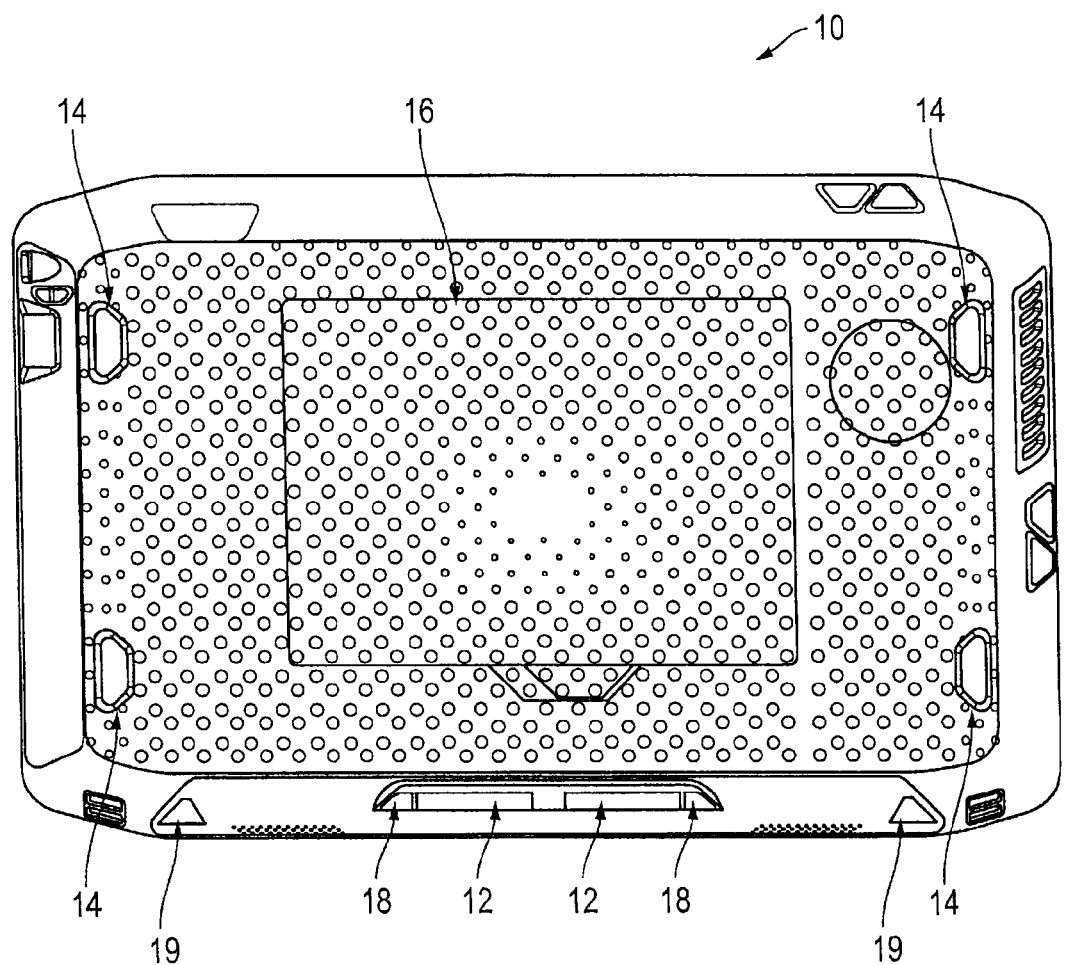
FIG. 3 is a back view of the portable electronic device illustrating exemplary locations for the docking connector and the magnetic structure(s) on the back surface of the portable electronic device, according to one embodiment.
Figure 4:
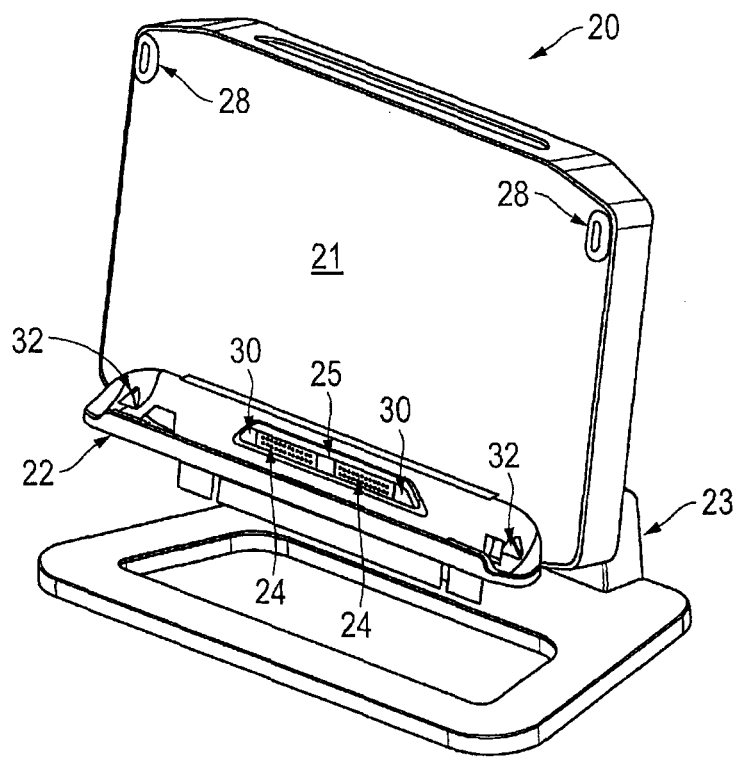
FIG. 4 is a perspective view of the docking station having a rotating cradle for supporting a base of the portable electronic device, and a floating docking connector for engaging with the docking connector on the back surface of the portable electronic device.
Figure 5:
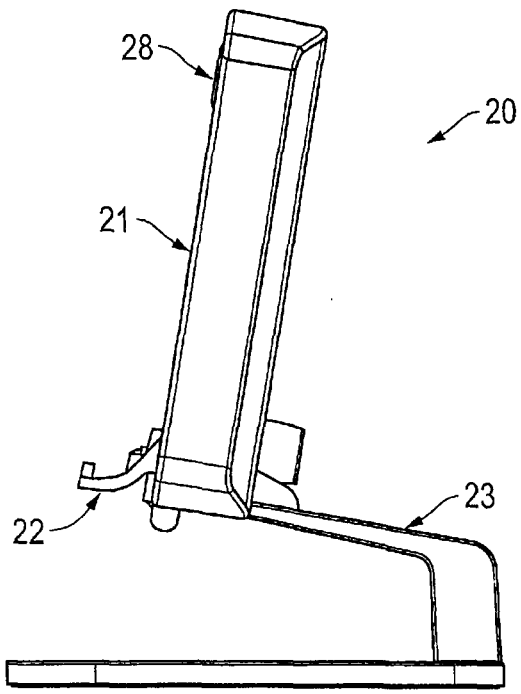
FIG. 5 is a side view of the docking station shown in FIG. 4.

In some embodiments, the portable electronic device 10 and the docking station 20 may each include a pair of magnets (e.g., magnets 14 and 28) arranged roughly near the top edges or top corners of the devices, as illustrated in FIGS. 3-5. In other embodiments, the portable electronic device 10 and the docking station 20 may each include four magnets roughly positioned near the top and bottom corners of the two devices, as shown in FIGS. 3 and 6. In yet other embodiments, one or more magnets may be used in docking station 20 for magnetically adhering to one or more metal feet (also considered to be "magnetic structures") formed on a back surface of the portable electronic device 10 (or vice versa). Alternative arrangements of magnetic structures may also be considered. In general, the compressive force needed to mechanically engage the docking connectors should be considered when selecting the magnetic structures (e.g., magnets and/or metal feet) to be included on the opposing surfaces of the portable electronic device 10 and the docking station 20, and the positioning of those structures. The only caveat is that the magnetic structures of the portable electronic device 10 and the docking station 20 should be aligned.

In addition to providing a more reliable electrical connection between the docking connectors 12 and 24, the magnetic force ($F_{mag}$) provided by the magnetic structures helps to align and retain the portable electronic device 10 on the support surface 21 of the docking station without the need for an additional mechanical latch. This greatly simplifies the docking station 20 by omitting the complex mechanical latch mechanism used in many conventional docking stations, and reduces the number of steps the user has to perform to dock and undock the portable electronic device 10. As shown in FIG. 2, the user need only grasp the portable electronic device 10 and rotate it away from the support surface 21 of the docking station 20. The rotational movement of the rotating cradle 22 not only severs the attractive forces between magnets 14 and 28, but also disengages the floating docking connector 24 of docking station 20 from the docking connector 12 on the portable electronic device. Once the docking connectors are disengaged, the portable electronic device 10 can be easily removed from the rotating cradle 22.

FIG. 3 illustrates the portable electronic device 10 as a tablet PC or a slate computer, as these devices are most commonly used with docking stations. However, the portable electronic device 10 described herein may just as easily comprise other forms, such as a smart phone, a portable music player (e.g., an mp3 player), an e-reader, a netbook, a laptop, or a personal digital assistant (PDA). In general, portable electronic device 10 may be any portable device that can be docked.

FIG. 3 is a back view of the portable electronic device 10, according to one embodiment of the invention. In particular, FIG. 3 illustrates exemplary locations for the docking connector 12 and the magnetic structure(s) 14 on the back surface 16 of the portable electronic device 10. According to one embodiment, the docking connector 12 may be located near the base or bottom of the portable electronic device, generally near the center of the device. However, since many electronic devices allow the screen orientation to be changed (e.g., between two different landscape orientations and two different portrait orientations), the terms "base," "bottom," "top," and "side" as they relate to a portable electronic device are all relative. In general, one skilled in the art would understand that the placement of the docking connector 12 is generally fixed, but may not always be found on the "bottom" of the portable electronic device.

In some embodiments, docking connector 12 may include a number of receptacles or alternatively a number of pins, as discussed above. In other embodiments, docking connector 12 may be a pinless connector, as discussed above. In some embodiments, fine alignment guide features 18 may be included on either side of the docking connector 12 for aligning with the guide features 30 (see, e.g., FIGS. 4 and 6) included on docking connector 24. In some embodiments, docking connector 12 may further include one or more gross alignment guide features 19 for aligning with the guide features 32 (see, e.g., FIGS. 4 and 6) included on rotating cradle 22.

According to one embodiment, portable electronic device 10 includes a plurality of magnetic structures 14 arranged on the back surface 16 of the device. In general, one or more of these magnetic structures 14 may comprise magnets, while any remaining magnetic structures comprise metal feet. Although four magnetic structures 14 are illustrated in FIG. 3 as generally positioned within or near the top and bottom corners of the portable electronic device 10, one skilled in the art would understand how a different number of magnetic structures may be used, or how the magnetic structures could be alternatively positioned, so as to align with corresponding magnetic structures on the support surface 21 of the docking station 20.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A docking station, comprising:
   a support surface configured for supporting a back surface of a portable electronic device;
   a rotating cradle configured for receiving a base of the portable electronic device, wherein the rotating cradle is connected to a lower portion of the support surface by a pivot point that allows the rotating cradle to be rotated about a rotational axis toward and away from the support surface; and
   a floating docking connector, which is concealed within a recess of the rotating cradle when the rotating cradle is rotated about the pivot point away from the support surface for receiving the base of the portable electronic device.

2. The docking station as recited in claim 1, wherein the floating docking connector extends out of the recess for connecting to a docking connector of the portable electronic device when the rotating cradle is rotated about the pivot point towards the support surface.

3. The docking station as recited in claim 1, wherein the support surface comprises a niche for receiving the rotating cradle when the rotating cradle is positioned against the support surface.

4. The docking station as recited in claim 1, wherein the rotating cradle comprises a pair of posts extending inward and substantially perpendicularly from an interior surface of the rotating cradle, wherein the floating docking connector is mounted onto the pair of posts via a pair of holes formed in a rear portion of the floating docking connector, and wherein a diameter of the posts is configured to be smaller than a diameter of the holes so that the floating docking connector can rotate separate and apart from the rotating cradle.

5. The docking station as recited in claim 4, wherein a backside of the floating docking connector comprises a contact pad, which is configured to roll against a corresponding contact pad located within a niche of the support surface when the rotating cradle is rotated about the pivot point away from and towards the support surface.

6. The docking station as recited in claim 5, wherein when the rotating cradle is rotated about the pivot point toward the support surface, the contact pad on the backside of the floating docking connector rolls against the corresponding contact pad located within the niche to extend at least a portion of the floating docking connector out of the recess.

7. The docking station as recited in claim 5, wherein when the rotating cradle is rotated about the pivot point away from the support surface, the contact pad on the backside of the floating docking connector rolls against the corresponding contact pad located within the niche to retract and conceal the floating docking connector within of the recess.

8. The docking station as recited in claim 4, wherein the floating docking connector further comprises a pair of springs, which are coupled between the rear portion of the floating docking connector and the interior surface of the rotating cradle and wound around the pair of posts, and wherein a spring force provided by the pair of springs assists in moving the floating docking connector in and out of the recess when the rotating cradle is rotated about the pivot point away from and towards the support surface.

9. The docking station as recited in claim 1, wherein the floating docking connector comprises a number of pins and the docking connector comprises a number of receptacles configured for receiving the pins.

10. The docking station as recited in claim 1, wherein the floating docking connector of the docking station and the docking connector of the portable electronic device each comprise pinless docking connectors.

11. The docking station as recited in claim 1, wherein the support surface of the docking station comprises one or more magnetic structures, which are positioned to align with one or more magnetic structures on the back surface of the portable electronic device and configured to provide a magnetic force to retain the portable electronic device on the support surface.

12. The docking station as recited in claim 11, wherein the one or more magnetic structures positioned on the support surface of the docking station are positioned away from the rotational axis to increase a compressive force applied to the floating docking connector of the docking station and the docking connector of the portable electronic device.

13. The docking station as recited in claim 11, wherein the one or more magnetic structures positioned on the support surface of the docking station are arranged near a top edge of the support surface.

14. The docking station as recited in claim 11, wherein the one or more magnetic structures positioned on the support surface of the docking station are arranged near a bottom edge of the support surface.

15. The docking station as recited in claim 11, wherein the docking station does not include a mechanical latch for retention of the portable electronic device on the support surface.

16. The docking station as recited in claim 11, further comprising a mechanical latch with a locking mechanism for securing the portable electronic device on the support surface.

* * * * *